Feb. 27, 1962 F. P. ROSAPEPE 3,022,938

ROTARY-COUNTER REGISTER

Filed Sept. 19, 1956 2 Sheets-Sheet 1

Inventor
Frank P. Rosapepe
by Roberts, Cushman & Grover
Att'ys

Inventor
Frank P. Rosapepe
by Roberts, Cushman & Grover
Att'ys 3,022,938
Patented Feb. 27, 1962

3,022,938

ROTARY-COUNTER REGISTER

Frank P. Rosapepe, Cranston, R.I., assignor, by mesne assignments, to Universal Controls, Inc., New York, N.Y., a corporation of Maryland Filed Sept. 19, 1956, Ser. No. 610,814
4 Claims. (Cl. 235—42)

This invention relates to improvements in registers and more especially to rotary-counter type registers.

In a rotary-counter register number bearing discs are arranged side by side in coaxial series and connected with one another by gearing so devised that for each complete revolution of a disc of lower order, the disc of next higher order will be turned one division. The counting is progressive, that is, the disc of lowest order must count the entire number of units of the deposited coins and add the amount, revolution, by revolution to the next disc and since the speed that the unit disc can be turned is limited the register cannot keep up when several fares are deposited in close succession. The principal object of this invention is to increase the speed of counting so as to reduce the lag in totaling the fare when a number of fares are deposited in the meter in close succession, and especially when coins of large denominations are deposited, to add in totals or aliquot parts of totals of the coins of larger denomination to the discs of higher order so that a disc of lower order is not required to be stepped through the entire number of units of each of the coins, revolution by revolution, in order to add the amount to the disc next higher in order. Another object is to increase the speed of registration by adding in tokens as units or parts of units to the discs of higher order.

As herein illustrated, the counter has a shaft on which there are mounted side by side a series of counter-discs in increasing order of value. The disc of lowest order (the unit disc) is fixed to the shaft and the others are free to turn on the shaft. Between successive discs there is means for causing the disc of next higher order to turn one division for each complete revolution of the preceding disc. In accordance with the invention the interconnecting means between the fixed disc (the unit disc) and the disc next in order (the ten disc) or between any two adjacent discs may include a one-way clutch which affords a driving connection between the successive discs in one direction to turn the driven disc one division for each complete revolution of the driving disc and yet permit the driven disc to be turned independently of the driving or preceding disc and there is other means for turning the driven disc one or more divisions independently of the driving disc. The clutch is in the form of a gear located between the discs which carries one or more pawls operably associated with a ratchet wheel fast to the adjacent face of the driven disc to drive the driven disc in one direction. A pinion fast to a countershaft meshes with the gear and is operable by means carried by the driving disc to turn the gear one division for each complete revolution of the driving disc. The other means is a gear on the opposite face of the driven disc, a countershaft with meshing gear and means operably associated with the countershaft for turning the disc one division for each whole number of units carried by the disc contained in a coin of predetermined value having a whole number of units corresponding to that disc or a multiple thereof.

The invention will now be described in greater detail with reference to the accompanying drawings wherein.

Figure 1:
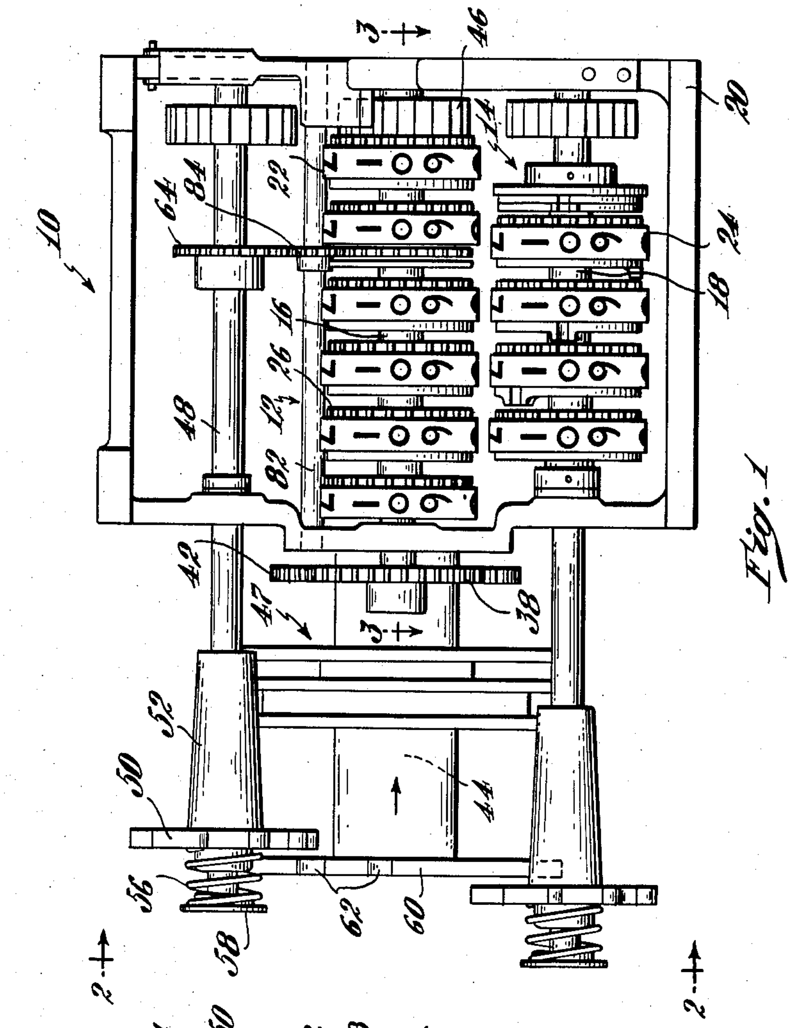
FIG. 1 is a side elevational view of a rotary-type counter embodying my invention.

Referring to the drawings, the numeral 10 designates generally a rotary-type counter of the kind disclosed in Patent No. 2,723,081. As herein shown there are two rows of rotary numeral discs 12 and 14 designed to count coins and tokens respectively, and while the invention is applicable to totaling tokens as well as coins it will be described specifically with reference to coins and hence the specification will deal primarily with the row of numeral discs 12.

Figure 3:
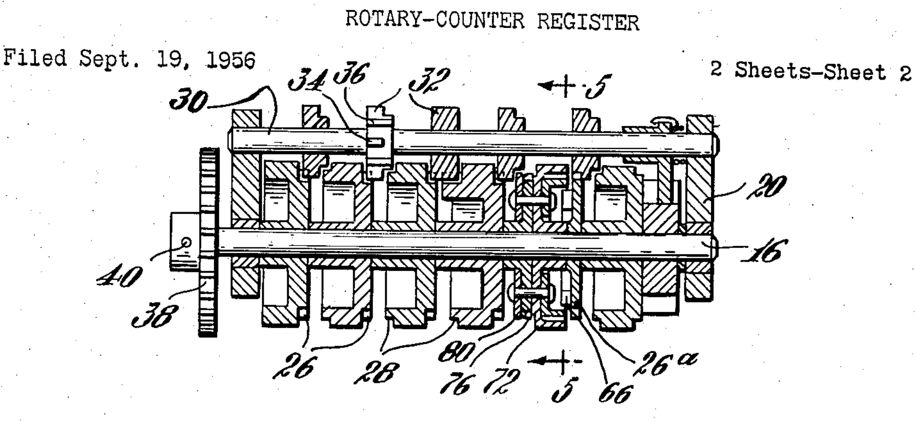
FIG. 3 is a sectional view taken substantially along the lines 3—3 of FIG. 1.
Figure 4:
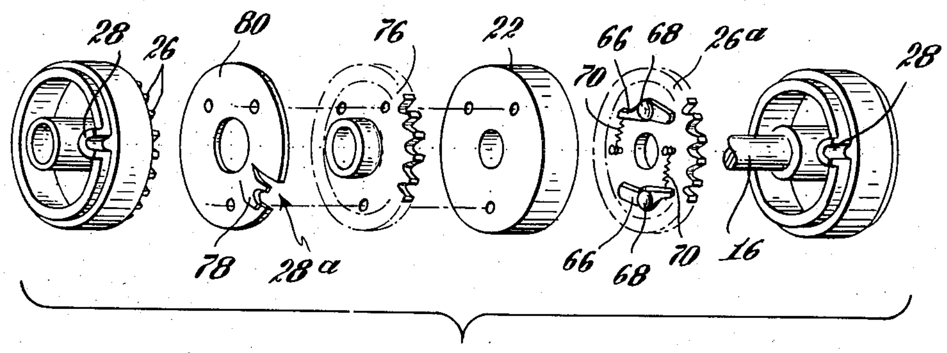
FIG. 4 is an exploded elevation longitudinally of the counter showing one row of counter-discs.

The row of numeral discs 12 has six digit counters, although it is to be understood that the number of counters may be varied without departing from the scope of the invention. The counters are mounted on a shaft 16 and the latter is journaled in a supporting frame 20 of generally rectangular shape. The discs on the shaft are mounted in coaxial relation and slightly spaced apart, there being one disc for each digit of a row. The right-hand disc 22, which is the disc of lowest order, is fixed to its shaft by a key or its equivalent, as shown in FIG. 3, the other discs being free on the shaft. The right-hand face of each counter-disc except the second from the right has a gear 26 secured to it, or which is preferably molded on the face of the disc. The second disc from the right, unlike the patented device, has an independent gear **26*a* associated therewith, as will appear hereinafter. The left-hand face of each of the discs, except for the second from the right and the left-hand disc, has a gear segment 28, having two teeth, secured to it, the teeth preferably being molded on the face of the disc. The second disc from the right, unlike the patented structure, has an independent gear segment 28*a* (FIG. 4) associated therewith, as will subsequently appear. The discs are arranged on the shaft so that the segment gear 28 or 28*a* of one disc is closely adjacent to the gear 26 or 26*a*** of the next adjacent disc to the left.

A stationary shaft 30 is associated with the row of numeral discs 12, which shaft 30 is fixed at its opposite ends in the supporting frame and is parallel to and has its axis in the horizontal plane of the axis of the shaft 16. The shaft 30 carries a plurality of freely rotatable pinion gears 32, the several pinion gears 32 being alike and each being mounted to rotate in the plane passing between two of the adjacent numeral discs. Each pinion gear 32 has a plurality of short teeth 34 (FIG. 3) intervening between long teeth 36, the short teeth being of a width, axially of the pinion, such that they engage only with the teeth of the segment gear 26 or **26*a***.

At the completion of each rotation of a disc of lower order its gear segment 28 or **28*a* will engage the teeth 36 of the pinion 32 associated therewith, and will turn the pinion sufficiently so that the pinion teeth 34 having engagement with the gear 26 or 26*a*** of the adjacent disc will turn the latter disc one division. Thus for each complete rotation of the disc of lower order, the adjacent disc of higher order will turn an angular amount equal to one division.

As in the patent named the counter 12 is rotated by means of a gear 38 (FIG. 1) which is secured to the shaft 16 by means of a pin 40 so as to rotate therewith. The gear 38 engages with a drive gear 42 rotatably mounted on a shaft 44, which shaft makes one complete rotation for each cycle of operation of the machine. A clutch, designated generally 47, the mechanism of which forms no part of this invention and is not shown, is operable to engage the gear 42 with the shaft 44 at predetermined points of the rotation of said shaft so that for each one cent piece registered the disc 22 will be rotated one division, for each nickel registered the disc 22 will be rotated five divisions and for each dime registered the disc 22 will be registered ten divisions.

Overrun of the disc of the row 12 is prevented by a ratchet wheel 46 secured to the shaft 16 in the same manner as described in the aforesaid patent and hence will not be repeated herein.

Figure 2:
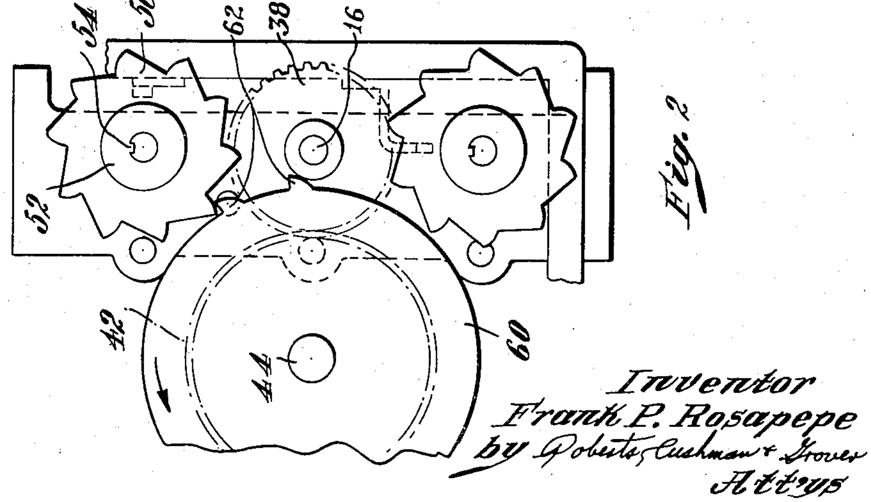
FIG. 2 is a fragmentary edge elevational view thereof, looking in the direction of the arrows 2—2 of FIG. 1.

In the patented counter the row of counter-discs corresponding to the row 12 herein, counted pennies, nickels and dimes and another row counted quarters. According to this invention, the row 12 is designed to combine the counting of quarters with the counting of pennies, nickels and dimes, accordingly the counter-discs of the upper row of discs shown in the patent referred to above have been omitted but the shaft which supported those discs has been left in place. This shaft, herein designated 48, has on it a tooth wheel 50. The tooth wheel has an elongated hub 52 slidable on the shaft, the hub being connected to rotate with the shaft by means of a suitable key 54 (FIG. 2). A compression spring 56 positioned between the hub of the wheel 50 and an abutment 58 fixed to the shaft 48 urges the wheel 50 axially of the shaft toward the right as viewed in FIG. 1.

A disc 60 having a pair of peripheral teeth 62 is fixed to the shaft 44 so as to rotate with the latter. Gauging means (not shown), including a part which has contact with the edge of a coin or the like, and is thereby variably positioned in accordance with the diameter of the particular coin which it contacts, includes devices, for example cam elements operable by engagement with the tooth wheel 50, according to the coin being engaged, to move the tooth wheel 50 axially into the plane of rotation of the disc 60. The tooth wheel 50 has ten teeth and when the teeth 62 of the rotary disc 60 engages the teeth of the tooth wheel 50 the latter is turned two tooth spaces, thereby turning the shaft 48 two-tenths of a revolution.

Fast to the shaft 48 there is a gear 64 which is accordingly turned through two tooth spaces.

Figure 5:
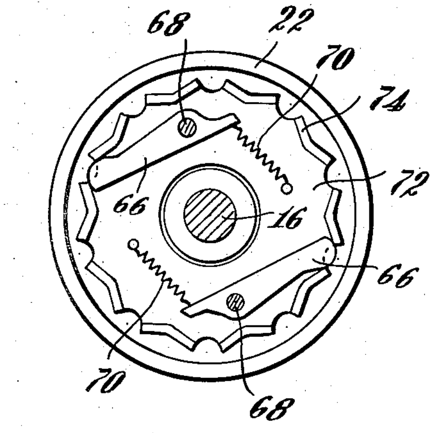
FIG. 5 is a section taken on the line 5—5 of FIG. 3.

In order to count quarters the second counter disc 22 from the right-hand end of the shaft 16 (FIG. 2) is modified in structure from the other discs in the following respects. The gear **26*a* (FIG. 4) at the right-hand side of this second disc 22 is made movable with respect to the disc, the gears on the other discs being fixed and preferably molded integral therewith as previously explained. The gear 26*a*, however, is free to turn on the shaft 16 and has at diametrically disposed points, at opposite sides of its center (FIG. 4), a pair of pawls 66, pivoted at 68, which are rocked outwardly from the center and yieldably held by springs 70. The adjacent face of the disc 22 (FIG. 5) has a circular recess within which there is an annular ratchet wheel 72 which has teeth 74 with which the pawls 66 drivably engage in one direction and non-drivably engage in the other direction thus providing a clutch. As illustrated, when the gear 26*a* is turned in a clockwise direction (FIG. 4) or counterclockwise (FIG. 5), the disc 22 is caused to turn in a corresponding direction. Thus it is apparent that the disc 22 can be turned independently of the gear in a clockwise direction (FIG. 4) or counterclockwise (FIG. 5), since rotation thereof tends to deflect the arms inwardly in opposition to the springs so that the annular ratchet wheel 72** rides over these arms without driving.

The opposite face of the second disc 22 is provided not only with a double-tooth gear segment **28*a* but also with a complete gear 76 (FIG. 4) which is interposed between the disc 22 and the gear segment 28*a*, the gear 76 has the same number of teeth as the gear 64. Unlike those on the other discs which are molded on their faces, the gear segment 28*a* is struck out in the form of a prong 78 from a flat circular plate 80 fastened to the outer face of the gear 76. The gear 32 on the shaft 30 opposite the second disc has its long teeth in a position to mesh with the prong 78 and its short teeth in a position to mesh with the gear 26 on the adjacent face of the next disc 22**.

Between the shaft 48 and the shaft 16 and parallel thereto (FIG. 2), there is mounted a shaft 82 which has fast to it a gear 84, which gear meshes both with the gear 64 and with the gear 76. Thus rotation of the shaft 48 imparts rotation to the gear 76 and hence rotation to the second disc 22 independently of the gear **26*a*, by reason of the slip clutch construction described above. As previously pointed out, the shaft 48 is rotated through two-tenths of a revolution when a quarter is deposited in the meter so that the second disc 22 will be turned through two notches of rotation thus registering twenty cents. The remaining five cents will be registered by the first disc 22** which will turn through five units to place in the total of twenty-five cents.

Overrun of the shaft 48 is prevented by a ratchet wheel 85 in the same fashion as was described in the register of the aforesaid patent.

While the design embodiment of the invention has been illustrated herein for the purpose of adding quarters as units for totaling them with pennies, nickels and dimes in order to increase the rapidity with which the device will add, it is to be understood that nickels, dimes, quarters, half-dollars or any other denomination might be added more rapidly as units by means of a similar arrangement of parts without departing from the spirit of the invention. It is also to be understood that the row of counters 14 herein illustrated, and which as described in the prior patent is for counting tokens, may be omitted except for the shaft on which they are mounted and the latter may be provided with gearing such as described above directly connected to the discs on the row 12 for the purpose of adding in the amount of a token as a unit, for example if a token represented a ten cent piece, the shaft could be rotated through a one-tenth of a revolution to cause the second counter-disc in the row of discs 12 to turn one-tenth of a revolution. It is to be understood that the place of addition can be varied according to the nature of the coins to be employed.

As herein illustrated the device operates as follows: The 0.01 counter-disc 22 which is fixed to the shaft 16 is driven by coin gauging means such for example as disclosed in Patent No. 2,848,158 of Harry B. Miller, Serial No. 216703, filed March 21, 1951, through the gears 38 and 42. The gear 42 is mounted on the coin machine. The mechanics of the coin gauging means are so arranged that when a penny is deposited the disc is turned through 36°, when a nickel is deposited the disc is turned through 180°, when a dime is deposited the disc is turned through 360°, and when a quarter is deposited the disc is turned through 180°. Each counter-disc 22 has a digit (0 through 9) marked every 36°, on its periphery. Therefore, a penny entering the coin machine will register one digit on the 0.01 counter-disc; a nickel will register five digits; a dime ten digits, and a quarter five digits. The registering of the remaining twenty cents for the quarter will be explained hereinafter. When the number nine digit of any disc is reached, the process of indexing to the next digit zero will transfer the count from that counter-disc to the adjacent counter-disc by indexing the latter one digit. This is accomplished in the case of the 0.01 and 0.10 counter-discs by the gear segment 28 on the 0.01 counter-disc which meshes with the pinion 32 opposite it which in turn meshes with the clutch gear **26*a* whose pawls 66 are engaged with the teeth 74 of the 0.10 counter-disc and thereby rotates the latter one digit for each complete revolution of the 0.01 counter disc. In transferring from the 0.01 to the 1.00 counter-disc the gear segment 28*a*, which in this case is carried by the attached plate 80 and is constituted by the integral prong 78, actuates the pinion 32** opposite it which is in mesh with the molded gear teeth 26 of the 1.00 counter-disc and thereby indexes it one digit. In transfering from the 1.00 to the 10.00 counter-disc the molded gear segment 28 on the 1.00 counter-disc operates the pinion 32 opposite it which in turn meshes with the gear 26 on the 10.00 counter-disc and hence indexes the 10.00 counter-disk one digit. In this manner, cash totaling up to $9,999.00 can be registered on the counter before returning to zero.

As heretofore pointed out for counting quarters, it is impractical to index the 0.01 counter-disc twenty-five times because of the speed involved and of the mechanics of the coin machine, and it is for this reason that the one way clutch is interposed between the 0.01 counter-disc and the 0.10 counter-disc, and that the 0.10 counter-disc is provided with means for indexing it independently of the 0.01 counter-disc. In accordance with the structure previously described when a quarter enters the coin machine, an arm will move the wheel 50 from its normal position (FIG. 2) to a position in line with the rotary disc 60. In revolving one turn, the two teeth 62 on the disc 60 will come in contact with the teeth on the wheel 50 and will index it two teeth. Indexing the wheel 50 two teeth will rotate the 0.10 counter-disc two digits corresponding to twenty cents, this being effected through the gear train 64—84—76. The clutch associated with the gear 26*a* will allow the 0.10 counter-disc to rotate without disturbing the 0.01 counter-disc. When the 0.10 counter-disc turns clockwise the teeth 74 ride over the pawls 66, thus acting independent of the 0.01 counter-disc. However when the 0.01 counter-disc turns clockwise and the gear sector 28 meshes with the pinion 32 opposite it to actuate the clutch gear 26*a*, the pawls will engage the teeth 74 of the 0.10 counter-disc and rotate it. With this arrangement twenty cents of the quarter is registered on the 0.10 counter. The remaining five cents is registered in the conventional manner on the 0.01 counter-disc by indexing it five digits. When registering a quarter, the teeth on the disc 60 actuate the wheel 50 within the first 90° of rotation of the main shaft 44. The gear 42 registers the remaining five cents during the last 120° of the main shaft rotation. This timing allows for the proper functioning of the mechanism and eliminates interference.

It should be understood that the present disclosure is for the purpose of illustration only and that this invention includes all modifications and equivalents which fall within the scope of the appended claims.

I claim:

1. For use in combination with a coin collection apparatus having coin gauging means, a gauge arm, and a cyclically operable main shaft; a counter having two shafts, a plurality of digital counter-discs of increasing order arranged on one of the counter shafts side by side, the disc of lowest order being fixed to said one counter shaft and the succeeding discs being loose, means, connecting said one counter shaft to the main shaft, conditionable by the position of the gauge arm to cause said one counter shaft to advance the disc fixed thereto a number of digits corresponding to the digital value of any coin gauged, which is an aliquot part of the number of digits on the disc, a one direction clutch on said one counter shaft operably associated with a disc of higher order to rotate said disc, means carried by the disc of next lower order for engaging the clutch once during each complete revolution of the disc of lower order to advance the disc of higher order one digit, means on the other counter shaft for effecting rotation of said disc of higher order in the same direction, independently of the clutch, one or more digits, and other means on said other counter shaft operable when the gauge has contact with a coin of predetermined denomination which is a multiple of the digits on said disc of higher order, plus a fraction, to impart rotation to said other counter shaft to advance said disc of higher order a number of digits corresponding to said multiple while continuing to advance said one counter shaft by an amount corresponding to the number of digits exceeding the multiples in said coin.

2. For use in combination with a coin collection apparatus having coin gauging means, and a cyclically operable main shaft; a counter having two shafts, a plurality of digital counter discs of increasing order arranged on one of the counter shafts side by side, the disc of lowest order being fixed to said one counter shaft and the succeeding discs being loose, means, connecting said one counter shaft to the main shaft, conditionable by the position of the gauge arm to cause said one counter shaft to advance the disc fixed thereto, a number of digits corresponding to the digital value of any coin gauged, which is an aliquot part of the number of digits on the disc, a toothed clutch disc mounted on said one counter shaft between a pair of discs of higher order adjacent the disc of higher order, pawls on the face of the clutch disc next to the disc of higher order, a ratchet wheel on said disc of higher order with which the pawls cooperate to effect rotation of said disc of higher order in a direction corresponding to the direction of rotation of the preceding disc while permitting rotation of said disc of higher order, independently of the clutch disc, a pinion meshing with the teeth of the clutch disc, a single tooth on the preceding disc engageable with said pinion once during each complete revolution of said preceding disc to advance the disc of higher order one digit, a gear fixed to the other side of said disc of higher order, a gear on the other counter shaft, a pinion meshing with said gears for transmitting rotation from said other counter shaft to the disc of higher order on said one counter shaft, independently of said one counter shaft one or more digits, and other means on said other counter shaft operable when the gauge has contact with a coin of a predetermined denomination which is a multiple of the digits on said disc of higher order plus a fraction, to impart rotation to said other shaft to advance said disc of higher order a number of digits corresponding to said multiple while continuing to advance said one counter shaft by an amount corresponding to the number of digits exceeding the multiple in said coin.

3. For use in combination with a coin collection apparatus having coin gauging means, a gauge arm, and a cyclically operable main shaft; a counter having two shafts, a plurality of digital counter discs of increasing order arranged on one of the counter shafts side by side, the disc of lowest order being fixed to said one counter shaft and the succeeding disc being loose, a gear train including a clutch on said main shaft actuatable by the position of the gauge arm to effect rotation of the counter shaft and hence to advance the disc fixed thereto a number of digits corresponding to the digital value of any coin gauged, which is an aliquot part of the number of digits on the disc, a one direction clutch on said one counter shaft operably associated with one of the discs of higher order to rotate said disc, means carried by the disc of next lower order for engaging the said one direction clutch once during each complete revolution of said disc of lower order to advance the disc of higher order one digit, means on the other counter shaft for effecting rotation of said disc of higher order in the same direction independently of said one direction clutch one or more digits, and other means on said other counter shaft operable when the gauge has contact with a coin of a predetermined denomination which is a multiple of the digits on said disc of higher order plus a fraction, to impart rotation to said other counter shaft to advance said disc of higher order a number of digits corresponding to said multiple while continuing to advance said one counter shaft by an amount corresponding to the number of digits exceeding the multiple in said coin.

4. For use in combination with a coin collection apparatus having coin gauging means, a gauge arm, and a cyclically operable main shaft; a counter having two shafts, a plurality of digital counter discs of increasing order arranged on one of the counter shafts side by side, the disc of lowest order being fixed to said one counter shaft and the succeeding discs being loose, means, connecting said counter shaft to the main shaft, conditionable by the position of the gauge arm to cause said one counter shaft to advance the disc fixed thereto a number of digits corresponding to the digital value of any coin gauged, which is an aliquot part of the number of digits on the disc, a one direction clutch on said one counter shaft operably associated with one of the discs of higher order to rotate said disc, means carried by the disc of next lower order for engaging the clutch once during each complete revolution of the disc of lower order to advance the disc of higher order one digit, a toothed wheel fixed to the main shaft rotatable therewith once for each revolution of the main shaft, said wheel having teeth on it corresponding in number to the whole number of multiples of a coin of predetermined denomination to be added to said disc of higher order as multiples without passing through the disc of next lower order, a second toothed wheel slidable along said other counter shaft, means yieldably holding said second toothed wheel displaced with respect to the first toothed wheel so that normally the digital value of the coins making up a deposit are added to the counter through the fixed disc, and a cam operable by the gauge arm when said coin of predetermined denomination is deposited to shift the second toothed wheel into mesh with the first toothed wheel to rotate said second counter shaft and hence to advance the disc of higher order a number of digits corresponding to the multiple while continuing to advance said one counter shaft by an amount corresponding to the number of digits exceeding the multiples in said coin.

References Cited in the file of this patent

UNITED STATES PATENTS

| | | |
|---|---|---|
| 456,419 | Lawrenz | July 21, 1891 |
| 777,341 | Von Hoffman | Dec. 13, 1904 |
| 1,710,229 | MacNeill | Mar. 23, 1929 |
| 1,805,132 | Donnellan | May 12, 1931 |
| 2,848,158 | Miller | Aug. 19, 1958 |